United States Patent [19]
Rosenthal

[11] 3,923,125
[45] Dec. 2, 1975

[54] APPARATUS FOR THE CONTROLLED FEEDING OF LUBRICANTS AND COOLANTS TO ROTATING SURFACES IN CONTACT

[76] Inventor: Erich Rosenthal, Sandheider Strasse 201, 5605 Hochdahl, Germany

[22] Filed: Aug. 28, 1973

[21] Appl. No.: 392,230

[30] Foreign Application Priority Data
Aug. 28, 1972 Germany............................ 2242229
Mar. 21, 1973 Germany............................ 2325624

[52] U.S. Cl. ...................... 184/6; 222/368; 308/76; 277/DIG. 8
[51] Int. Cl.² .......................................... F01M 1/00
[58] Field of Search..... 308/76, 77; 184/6 R, 104 R, 184/6.14, 12, 61, 63; 277/DIG. 8, 56, 59; 222/367, 368

[56] References Cited
UNITED STATES PATENTS

| | | | |
|---|---|---|---|
| 2,230,881 | 2/1941 | Browne.......................... | 277/DIG. 8 |
| 2,270,927 | 1/1942 | Browne.......................... | 277/DIG. 8 |
| 2,322,866 | 6/1943 | Merz............................... | 222/368 X |
| 2,487,177 | 11/1949 | Pollock............................ | 277/56 |
| 3,021,146 | 2/1962 | Sommer et al................. | 277/DIG. 8 |
| 3,101,853 | 8/1963 | Long et al...................... | 222/368 X |

FOREIGN PATENTS OR APPLICATIONS

| | | | |
|---|---|---|---|
| 726,457 | 1/1966 | Canada.......................... | 277/DIG. 8 |
| 834,646 | 8/1938 | France........................... | 308/76 |
| 667,784 | 3/1952 | United Kingdom............ | 277/DIG. 8 |
| 671,769 | 5/1952 | United Kingdom............ | 308/76 |

*Primary Examiner*—Charles J. Myhre
*Assistant Examiner*—James D. Liles
*Attorney, Agent, or Firm*—Hamilton, Renner & Kenner

[57] ABSTRACT

An apparatus for the controlled delivery of a pressurized lubricating and cooling fluid to surfaces rotating in contact via the rotating surface. The apparatus has a stationary ring member, a rotatable ring member mounted in concentric relationship thereto, chambers disposed about the periphery of one of the ring members, ducts circumferentially disposed about the periphery of the other of the ring members and communicating with the chambers, feed ducts in the stationary ring member supplying the pressurized fluid, and transfer ducts in the rotating ring member communicating with the surfaces rotating in contact.

12 Claims, 6 Drawing Figures

3,923,125

APPARATUS FOR THE CONTROLLED FEEDING OF LUBRICANTS AND COOLANTS TO ROTATING SURFACES IN CONTACT

BACKGROUND OF THE INVENTION

This invention relates to an apparatus for feeding lubricants and coolants, in controlled quantities, to surfaces rotating in contact and comprises a fixed annular member and a rotating annular member in concentric relationship thereto, both said annular members exhibiting feed and transfer ducts for fluid terminating in apertures in the contacting surfaces of the annular members and in aligned arrangement so as to permit the flow of pressurized fluid from the one to the other of said annular members.

Apparatus of this kind lends itself in particular to applications on cardan shafts, universal spindles, couplings and other transmission elements providing for angular drive. The contact surfaces of such elements are subjected to very high frictional forces generated by the oscillating movements and must therefore be suitably and effectively lubricated and cooled. Fully effective hydrodynamic lubrication cannot be accomplished on surfaces moving in oscillating contact. In particular, the removal of the resulting frictional heat presents considerable difficulties. Moreover, this need to remove frictional heat precludes the use of grease lubrication.

SUMMARY OF THE INVENTION

The apparatus disclosed by this invention, comprising as afore-stated, a stationary annular member and a rotatable annular member in concentric relationship thereto, provides for the lubricant and coolant to be fed to such contacting surfaces in controlled amounts from a constantly circulating and recooled supply. This is effected by means of oppositely arranged ports in the contacting surfaces of said annular members to permit the transfer of the pressurized fluid from the one to the other of said annular members, on the one hand through one or a plurality of chambers of determinable length disposed at the periphery of the one of said annular members and, on the other hand, through one or a plurality of radial ducts disposed at intervals about the periphery of the other of said annular members.

Apparatus so designed permits the temperature of surfaces moving in contact to be maintained at a desired value through the controlled supply of lubricant and/or coolant. In the case of cardan trunnion blocks of plastics, for example, contact surface temperatures of 50° to 60° C, required for the loading conditions and to ensure adequate service life, can be maintained without difficulty.

The apparatus is comparatively inexpensive to manufacture, requires a minimum of space, is easy to service and, as only rotary movements are entailed, does not more than nominally interfere with the operation of the mechanisms in which it is installed. The efficiency of the apparatus can be increased, as further provided for by the invention, by incorporating two or more groups of chambers and radial ducts, alongside each other and in axial arrangement within a common annular member. One or more chambers or radial ducts can be made to supply a lubricant and/or coolant to specific contacting surfaces, whereby the length of the individual chambers and the number of radial ducts can be varied to suit the cooling and lubricating fluid flowrate required at the contact surfaces served by the respective chambers and radial ducts. To obviate the build-up of peak pressures in the delivery lines, it has proved advantageous for the length of a chamber to be greater than the distance between any two adjacent radial ducts. For applications calling for large quantities of lubricating and cooling medium, two chambers of staggered arrangement and spaced 180° apart can be provided in the stationary annular member and a plurality of equi-spaced radial ducts in the rotatable annular member. The arrangement of the chambers in the stationary member and the radial ducts in the rotatable annular member greatly simplifies the manufacture of said members.

Various other objects and advantages will appear from the following description taken in conjunction with the attached drawings, and the novel features will be particularly pointed out hereinafter in conjunction with the appended claims.

DESCRIPTION OF THE PREFERRED EMBODIMENT

Figure 1:
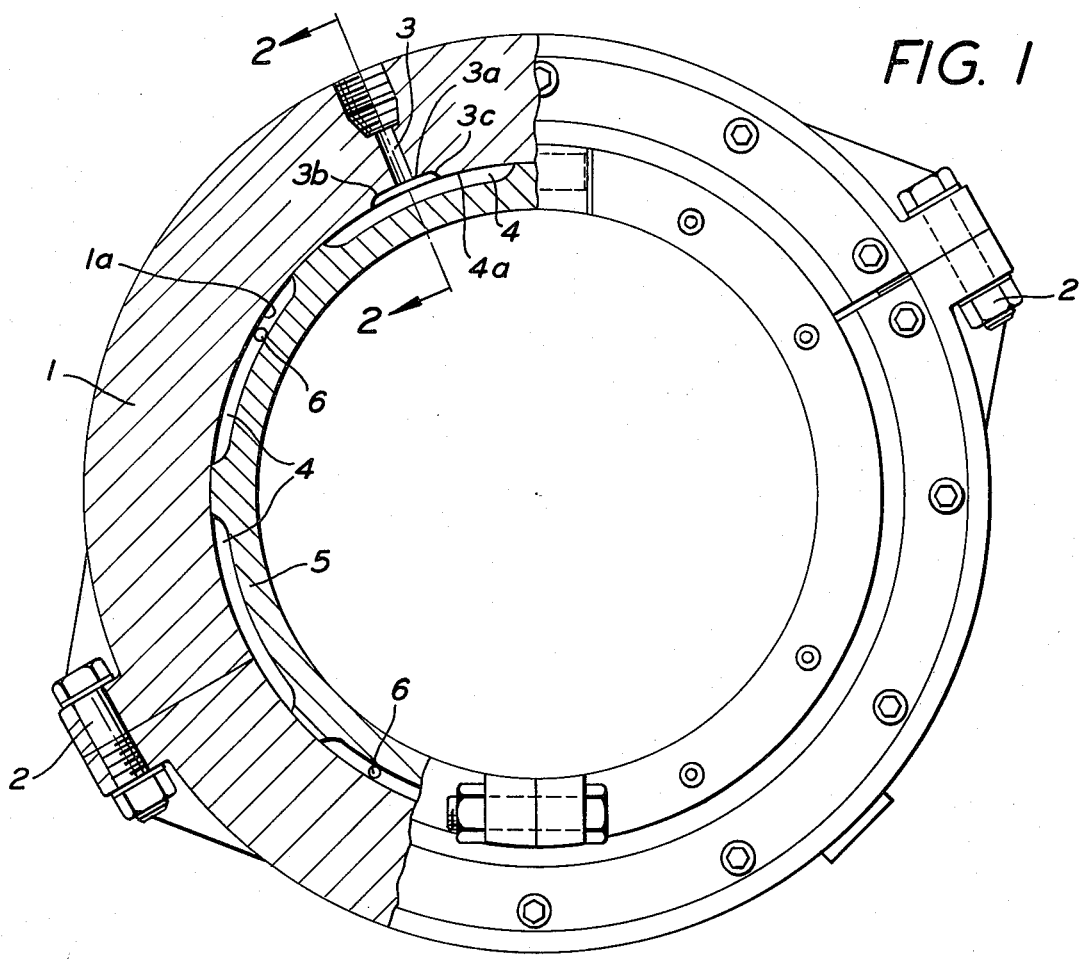
FIG. 1 shows the apparatus viewed in elevation in the axial direction, with portions broken away and parts shown in cross section.
Figure 2:
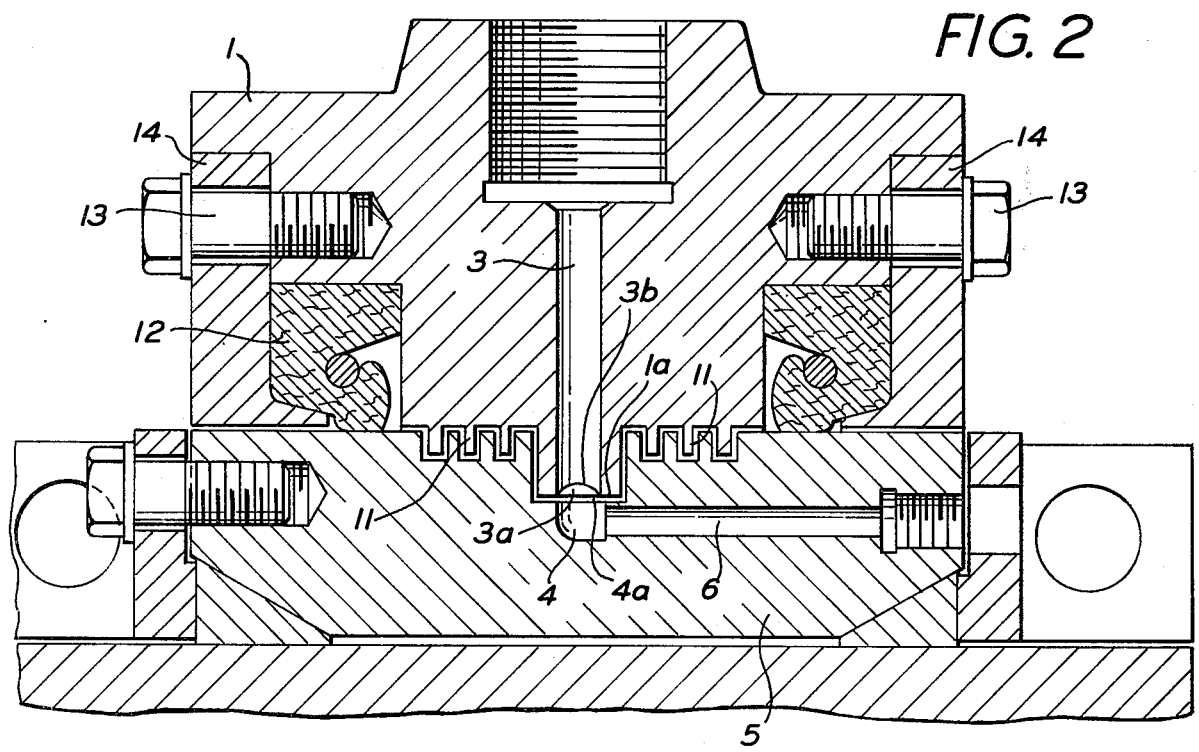
FIG. 2 is an enlarged fragmentary sectional view taken substantially along the line 2—2 of FIG. 1.

As can be seen in FIGS. 1 and 2, the apparatus therein depicted comprises a stationary split outer ring member 1, the two halves of which are bolted together in a manner known per se by bolt and nut fasteners 2. Outer ring member 1 is provided with a radial feed duct 3 which terminates as an aperture 3a on the inner face 1a of the ring member 1, said aperture 3a being immediately opposite a corresponding port 4a of a chamber 4 in a rotatable ring member 5 located within the stationary ring member 1. The fluid fed into the duct 3 flows through aperture 3a into chambers 4 as they pass by in sequence and is discharged from the chambers through transfer ducts 6 (see particularly FIG. 2) to the surfaces to be lubricated. The apertures 3a of the radial ducts 3 may be connected with annular grooves 3b, 3c, the length of which together with the diameter of the aperture 3a is greater than the distance between the adjoining ends of adjacent chambers 4, whereby ducts 3 remain in continuous communication with at least one port 4a.

As seen in FIG. 2, the escape of fluid between stationary ring member 1 and rotatable ring member 5 is controlled by labyrinth seals 11 arranged laterally to either side of ducts 3 and ports 4a and further to either side thereof a flexible packing ring 12 located against the rotatable ring member 5 and held removably in place by thrust member 14 secured by screw 13.

Figure 3:
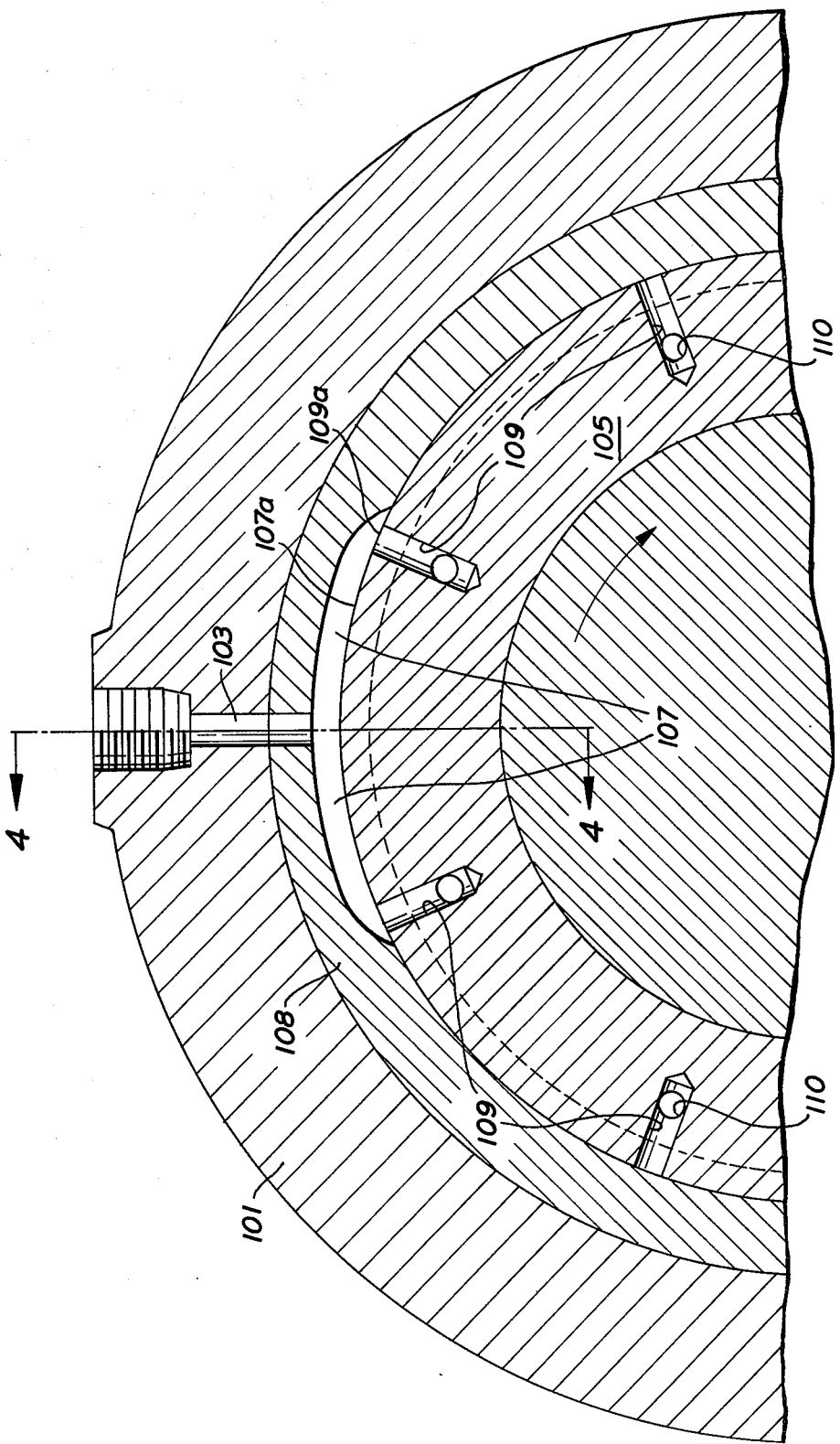
FIG. 3 is an enlarged fragmentary sectional view, similar to FIG. 1, showing another embodiment of the invention.
Figure 4:
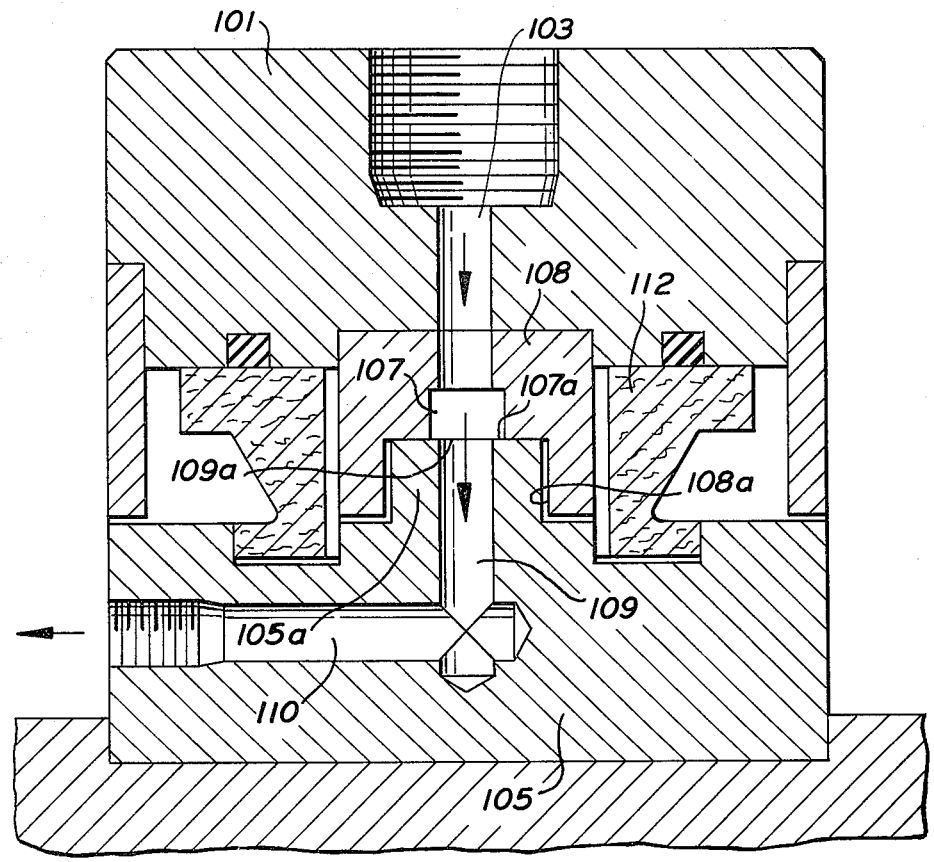
FIG. 4 is a fragmentary sectional view taken substantially along line 4—4 of FIG. 3.

The embodiment of the invention shown in FIGS. 3 and 4 has a stationary ring member 101 with a chamber 107 in an annular grooved carrier 108. In a manner similar to the case of the afore-described embodiment of FIGS. 1 and 2, the fluid in a feed duct 103 flows into chamber 107. A discharge port 107a formed by the chamber 107 communicates with apertures 109a which are located at the end of radial ducts 109 in a rotatable ring member 105. As will be evident from FIG. 4, the radial ducts 109 are incorporated in a collar 105a of the rotatable ring member 105, which serves as a guide for the annular groove 108a in the carrier means 108. As previously explained, the chambers 107 are arranged in the bottom of said annular groove 108a (see FIGS. 3 and 4). As in the case of the embodiment shown in FIGS. 1 and 2, the fluid flowing from chambers 107 into radial ducts 109 then passes through an axial transfer duct 110 to the contacting surfaces to be lubricated and cooled. In this embodiment the radial ducts 109 are circumferentially equi-spaced and the circumferential length of each chamber 107 is greater than the circumferential distance between any two adjacent radial ducts 109 to permit continuous fluid flow. One or more additional chambers 107 (not shown) could be incorporated in staggered relationship such as axially spaced and preferably at circumferential intervals, as for example 180°, to chamber 107 together with additional communicating ducts in ring member 105. The escape of fluid between stationary ring member 101 and the rotating ring member 105 is controlled by a flexible packing ring 112.

Figure 5:
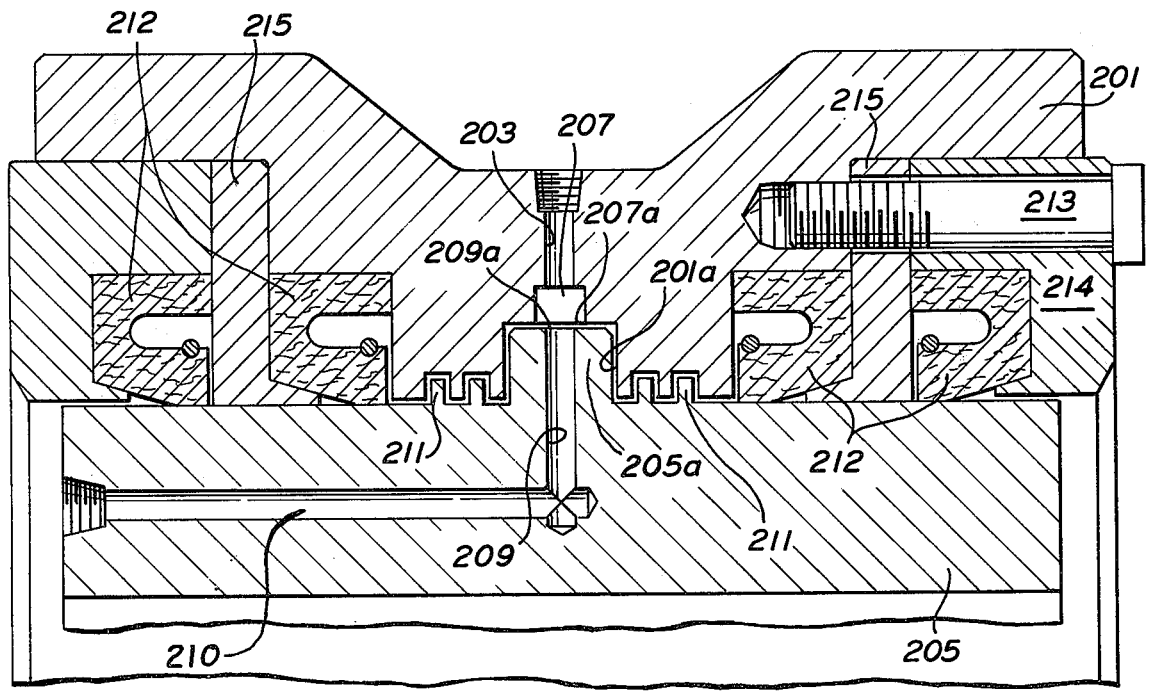
FIG. 5 is an enlarged fragmentary sectional view, similar to FIG. 4, of still another embodiment of the apparatus.

In the embodiment of the invention depicted in FIG. 5, there is provided, in a manner comparable to the FIGS. 3 and 4 embodiment, a stationary ring member 201 with a chamber 207. A discharge port 207a formed by chamber 207 communicates with apertures 209a which are located at the end of radial ducts 209 through which fluid passes to an axial transfer duct 210 in a rotatable ring member 205. As can be seen in FIG. 5, the radial ducts 209 are incorporated in a collar 205a of the rotatable ring member 205 which is guided in an annular groove 201a in the stationary ring member 201. It should be appreciated that the chamber 207 might also be located in the collar 205a of rotatable ring member 205 in a manner comparable to that depicted in the FIG. 1 and 2 embodiment of the invention.

In the embodiment shown in FIG. 5, labyrinth seals 211 are arranged in lateral relationship to the collar 205a and to the side thereof pairs of flexible packing rings 212 are located against the outer annular surface of the rotatable ring member 205 to prevent escape of fluid between stationary ring member 201 and rotatable ring member 205. The replaceable packing rings 212 are held securely in position by means of screws 213 and thrust members 214 in conjunction with spacers 215.

Figure 6:
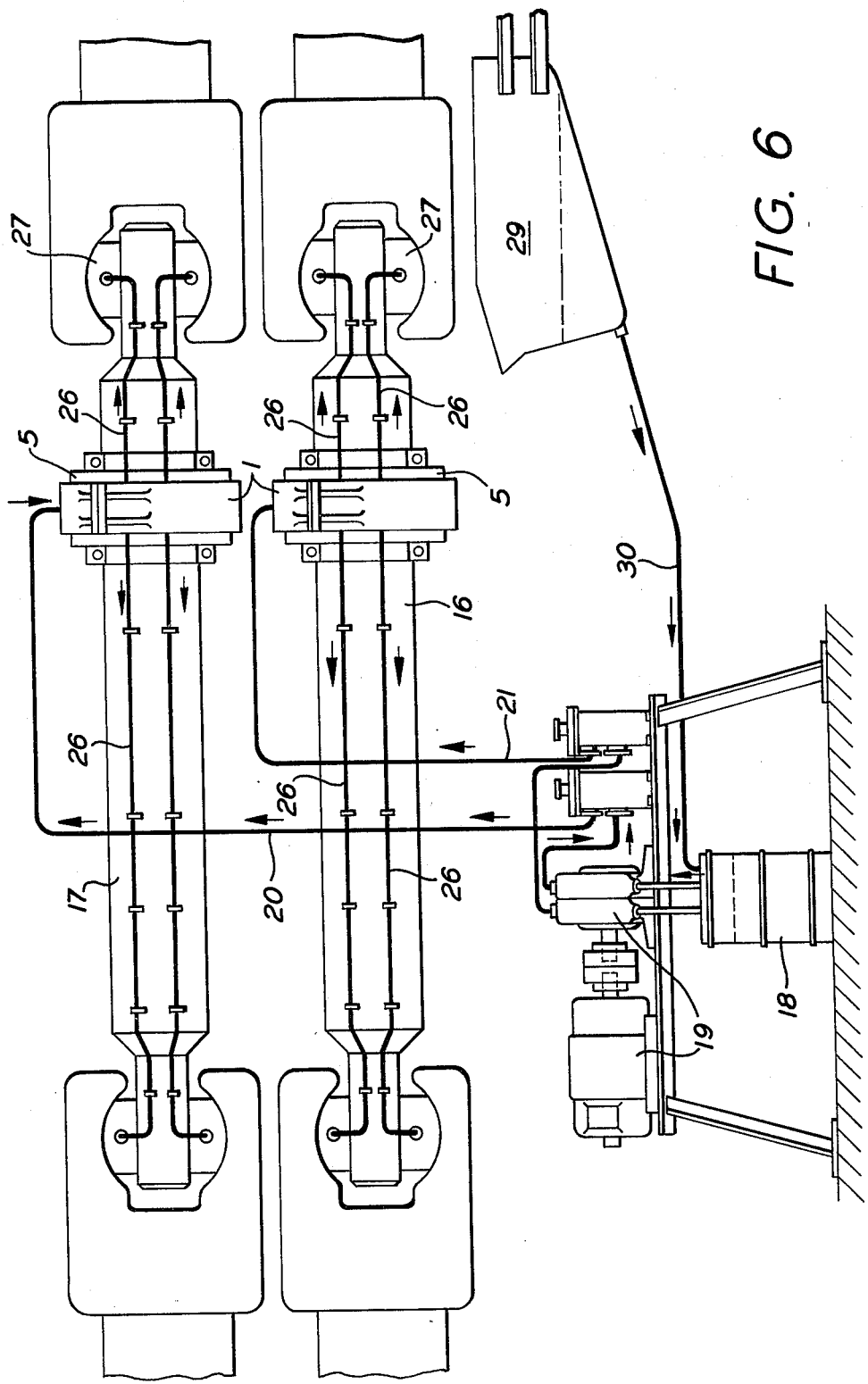
FIG. 6 is a schematic arrangement showing the apparatus according to the invention incorporated in an exemplary articulated spindle drive system.

FIG. 6 show schematically a typical embodiment of the apparatus installed on a pair of articulated spindles 16 and 17. The lubricating and cooling fluid is pumped from a reservoir 18 by a pump device 19 through supply lines 20 and 21 to the stationary ring members 1 and flows through the rotating ring members 5, which are nonrotatably attached to the spindles 16 and 17, via lines 26 to the cardan trunnion blocks 27. After having performed the cooling and lubricating functions, the fluid flows into a collecting pan 29, from which it drains through line 30 into the reservoir 18 for recirculation.

I claim:

1. Apparatus for the controlled delivery of pressurized lubricating and cooling fluid to distant surfaces rotating in contact comprising: stationary ring means, rotatable ring members mounted in concentric relationship to said stationary ring means, at least two feed ducts in one of said ring means and at least one transfer duct in the other of said ring means, at least two axially spaced chamber means disposed about a portion of the periphery of one of said ring means and communicating with said feed ducts, and at least two duct means circumferentially disposed about the periphery of the other of said ring means and communicating with said transfer duct, whereby the flow of the pressurized fluid from said transfer duct to distant surfaces rotating in contact is selectively fed from said chamber means to said duct means in quantities determined by the relative areas of said chamber means and said duct means.

2. Apparatus for the controlled delivery of pressurized lubricating and cooling fluid to distant surfaces rotating in contact comprising: stationary ring means, rotatable ring means mounted in concentric relationship to said stationary ring means, at least one feed duct in one of said ring means and at least one transfer duct in the other of said ring means, at least one chamber means disposed about a portion of the periphery of one of said ring means and communicating with said feed duct, duct means circumferentially disposed about the periphery of the other of said ring means and communicating with said transfer duct, wherein the circumferential length of said chamber means is greater than the circumferential distance between any two adjacent duct means and whereby the flow of the pressurized fluid from said transfer duct to distant surfaces rotating in contact is selectively fed from said chamber means to said duct means in quantities determined by the relative areas of said chamber means and said duct means.

3. Apparatus for the controlled delivery of pressurized lubricating and cooling fluid to distant surfaces rotating in contact comprising: stationary ring means, rotatable ring means mounted in concentric relationship to said stationary ring means, at least one feed duct in one of said ring means and at least one transfer duct in the other of said ring means, at least one chamber means disposed about a portion of the periphery of one of said ring means and communicating with said feed duct and having a circumferential length determined by the volume of the fluid required to be delivered to distant surfaces rotating in contact, and at least one duct means circumferentially disposed about the periphery of the other of said ring means and communicating with said transfer duct, whereby the flow of the pressurized fluid from said transfer duct to distant surfaces rotating in contact is selectively fed from said chamber means to said duct means in quantities determined by the relative areas of said chamber means and said duct means.

4. Apparatus for the controlled delivery of pressurized lubricating and cooling fluid to distant surfaces rotating in contact comprising: stationary ring means, rotatable ring means mounted in concentric relationship to said stationary ring means, at least one feed duct in one of said ring means and at least one transfer duct in the other of said ring means, at least one chamber means disposed about a portion of the periphery of one of said ring means and communicating with said feed duct, and duct means circumferentially disposed about the periphery of the other of said ring means, extending radially of said ring means and communicating with said transfer duct, whereby the flow of the pressurized fluid from said transfer duct to distant surfaces rotating in contact is selectively fed from said chamber means to said duct means in quantities determined by the relative areas of said chamber means and said duct means and wherein the number of said duct means is determined by the volume of the fluid required to be delivered to distant surfaces rotating in contact.

5. Apparatus for the controlled delivery of pressurized lubricating and cooling fluid to distant surfaces rotating in contact comprising: stationary ring means, rotatable ring means mounted in concentric relationship to said stationary ring means, at least two feed ducts in one of said ring means and at least one transfer duct in the other of said ring means, at least two chamber means disposed 180° apart in said stationary ring means and communicating with said feed duct, and duct means circumferentially disposed at equi-spaced intervals about the periphery of said rotatable ring means and communicating with said transfer duct, whereby the flow of the pressurized fluid from said transfer duct to distant surfaces rotating in contact is selectively fed from said chamber means to said duct means in quantities determined by the relative areas of said chamber means and said duct means.

6. Apparatus according to claim 1 in which said chamber means are provided in said stationary ring means and said duct means are incorporated in said rotatable ring means.

7. Apparatus according to claim 1 in which said feed and transfer means for said chamber means and said duct means are cylindrical ducts.

8. Apparatus according to claim 1 in which said transfer duct is a parallel duct extending axially of said rotatable ring means.

9. Apparatus for the controlled delivery of pressurized lubricating and cooling fluid to distant surfaces rotating in contact comprising: stationary ring means, rotatable ring means mounted in concentric relationship to said stationary ring means, at least one feed duct in one of said ring means and at least one transfer duct in the other of said ring means, at least one chamber means disposed about a portion of the periphery of one of said ring means and communicating with said feed duct, at least one duct means circumferentially disposed about the periphery of the other of said ring means and communicating with said transfer duct, a collar provided in one of said ring means incorporating said duct means and an annular groove provided in the other of said ring means for guiding said collar and in which said chamber means is located, whereby the flow of the pressurized fluid from said transfer duct to distant surfaces rotating in contact is selectively fed from said chamber means to said duct means in quantities determined by the relative areas of said chamber means and said duct means.

10. Apparatus according to claim 9 in which sealing means are arranged in lateral relationship to the collar.

11. Apparatus according to claim 1 in which said stationary ring means takes the form of an adjustable split ring.

12. Apparatus for the controlled delivery of pressurized lubricating and cooling fluid to distant surfaces rotating in contact comprising: stationary ring means, rotatable ring means mounted in concentric relationship to said stationary ring means, at least two feed ducts in one of said ring means and at least one transfer duct in the other of said ring means, at least two chamber means disposed about a portion of the periphery of one of said ring means and communicating with said feed ducts, duct means terminating in apertures circumferentially disposed about the periphery of the other of said ring means and communicating with said transfer duct, and annular grooves provided in one of said ring means, said apertures connecting said annular grooves with the length of one said groove together with the diameter of one said aperture being greater than the distance between adjoining ends of adjacent chamber means, whereby the flow of the pressurized fluid from said transfer duct to distant surfaces rotating in contact is selectively fed from said chamber means to said duct means in quantities determined by the relative areas of said chamber means and said duct means.

* * * * *

UNITED STATES PATENT OFFICE
CERTIFICATE OF CORRECTION

PATENT NO. : 3,923,125
DATED : December 2, 1975
INVENTOR(S) : Erich Rosenthal

It is certified that error appears in the above-identified patent and that said Letters Patent are hereby corrected as shown below:

Column 4, line 6, "members" should read -- means --.

Column 5, line 33, "means" (first occurrence) should read -- ducts --.

Signed and Sealed this eighteenth Day of May 1976

[SEAL]

Attest:

RUTH C. MASON
Attesting Officer

C. MARSHALL DANN
Commissioner of Patents and Trademarks